US012638137B2

(12) United States Patent
Bollinger et al.

(10) Patent No.: US 12,638,137 B2
(45) Date of Patent: May 26, 2026

(54) DEWAR WARMING ALARM MONITORING SYSTEM

(71) Applicant: Cryoport, Inc., Brentwood, TN (US)

(72) Inventors: Bret Bollinger, Yorba Linda, CA (US); Amir Vahid, Irvine, CA (US); Ashish Misra, Allen, TX (US); Chris Exline, Santee, CA (US); Pratik Khetiya, Irvine, CA (US)

(73) Assignee: Cryoport, Inc., Brentwood, TN (US)

( * ) Notice: Subject to any disclaimer, the term of this patent is extended or adjusted under 35 U.S.C. 154(b) by 0 days.

(21) Appl. No.: 18/409,110

(22) Filed: Jan. 10, 2024

(65) Prior Publication Data

US 2024/0247761 A1 Jul. 25, 2024

Related U.S. Application Data

(60) Provisional application No. 63/440,025, filed on Jan. 19, 2023.

(51) Int. Cl.
*G08B 17/00* (2006.01)
*F17C 13/02* (2006.01)

(52) U.S. Cl.
CPC .... *F17C 13/026* (2013.01); *F17C 2250/0439* (2013.01); *F17C 2250/0473* (2013.01); *F17C 2250/0478* (2013.01); *F17C 2270/0509* (2013.01)

(58) Field of Classification Search
CPC ............ F17C 13/026; F17C 2250/0439; F17C 2250/0473; F17C 2250/0478; F17C 2270/0509
USPC .......................................................... 340/589
See application file for complete search history.

(56) References Cited

U.S. PATENT DOCUMENTS

| | | | | |
|---|---|---|---|---|
| 2006/0237490 A1* | 10/2006 | Twitchell, Jr. | B65D 90/00 | 222/481.5 |
| 2009/0015400 A1* | 1/2009 | Breed | G07C 9/28 | 340/539.22 |
| 2010/0272609 A1* | 10/2010 | Haas | G01N 21/8483 | 422/82.05 |
| 2021/0169740 A1* | 6/2021 | Janzen | G06N 20/00 | |

(Continued)

FOREIGN PATENT DOCUMENTS

| | | |
|---|---|---|
| KR | 10-1963305 B1 | 3/2019 |
| WO | 2021195551 A1 | 9/2021 |

OTHER PUBLICATIONS

PCT; International Search Report and Written Opinion dated May 10, 2024 in Application Serial No. PCT/US2024/011028.

(Continued)

*Primary Examiner* — Tai T Nguyen
(74) *Attorney, Agent, or Firm* — Snell & Wilmer L.L.P.

(57) ABSTRACT

Systems and methods for monitoring environmental variables associated with temperature-sensitive products during shipping may include sensors attached to or inside a container being shipped and a remote processor receiving data provided by the sensors. For instance, temperature and orientation may be sensed over time and a status associated with a temperature-sensitive product may be determined based on the temperature and/or orientation and based on changes in the temperature and/or orientation over time. In this manner, potentially deleterious temperature and/or orientation excursions may be predicted and monitored.

19 Claims, 10 Drawing Sheets

(56) References Cited

U.S. PATENT DOCUMENTS

| | | | |
|---|---|---|---|
| 2021/0208558 | A1 | 7/2021 | Neeld |
| 2022/0086229 | A1 | 3/2022 | Skaaksrud |
| 2022/0099362 | A1 | 3/2022 | Satou |
| 2024/0076117 | A1 | 3/2024 | Wallin |

OTHER PUBLICATIONS

PCT; International Preliminary Report on Patentability (IPRP) dated Jul. 31, 2025 in PCT Application No. PCT/US2024/011028.

* cited by examiner

800

900

1000

DEWAR WARMING ALARM MONITORING SYSTEM

CROSS-REFERENCE TO RELATED APPLICATION

This application claims priority to and the benefit of U.S. Provisional Patent Application No. 63/440,025, titled "DEWAR WARMING ALARM MONITORING SYSTEM," filed on Jan. 19, 2023, the contents of which is incorporated by reference herein in its entirety.

FIELD OF INVENTION

The present disclosure relates to systems, methods, and programs for monitoring environmental conditions associated with a shipping container and more specifically, to systems, methods, and programs to provide electronic data corresponding to the monitored environmental conditions.

BACKGROUND

Frequently, there is a need to ship materials from one place to another place while maintaining the materials in environmentally controlled conditions. For instance, there is a need to maintain the materials at a specific temperature range. However, unexpected delays and other occurrences during shipping may lead to the materials being exposed to environmental conditions outside a desired range. For example, material may be shipped in a cryogenic shipping container having a Dewar with one or more cooling agent, such as liquid nitrogen therein. Over time, the cooling agent may dissipate, causing the materials to begin warming and the temperature of the materials to change, potentially exceeding the specific temperature range. Thus, there remains a need to remotely monitor conditions associated with the shipping container and provide various alerts to a remote operator of these conditions.

SUMMARY

Systems, methods, and articles of manufacture (collectively "the system") are disclosed for electronically monitoring temperature-sensitive material inside a shipping container during shipment. The system may electronically monitor variables associated with the shipping container during shipment and may determine whether the contents of the shipping container are at risk of spoilage due to temperature or other environmental changes. Because false alarms may be caused by transient conditions, the system may also compare the monitored variables to past data in order to determine if an environmental change is brief and passing or is persistent for sufficient time to possibly harm the contents of the shipping container. Moreover, the system may predict what the future value of the variables may be, so that a prediction may be made relating to how much time remains until the contents may undergo harm. In this manner, the system facilitates monitoring over the shipping journey and also facilitates interventions before harms occur.

BRIEF DESCRIPTION OF THE DRAWINGS

The subject matter of the present disclosure is particularly pointed out and distinctly claimed in the concluding portion of the specification. However, a more complete understanding of the present disclosure may be obtained by referring to the detailed description and claims when considered in connection with the drawing figures, wherein the numerals denote like elements.

A more complete understanding may be derived by referring to the detailed description and claims when considered in connection with the Figures, wherein like reference numbers refer to similar elements throughout the Figures, and:

DETAILED DESCRIPTION

Figure 1:
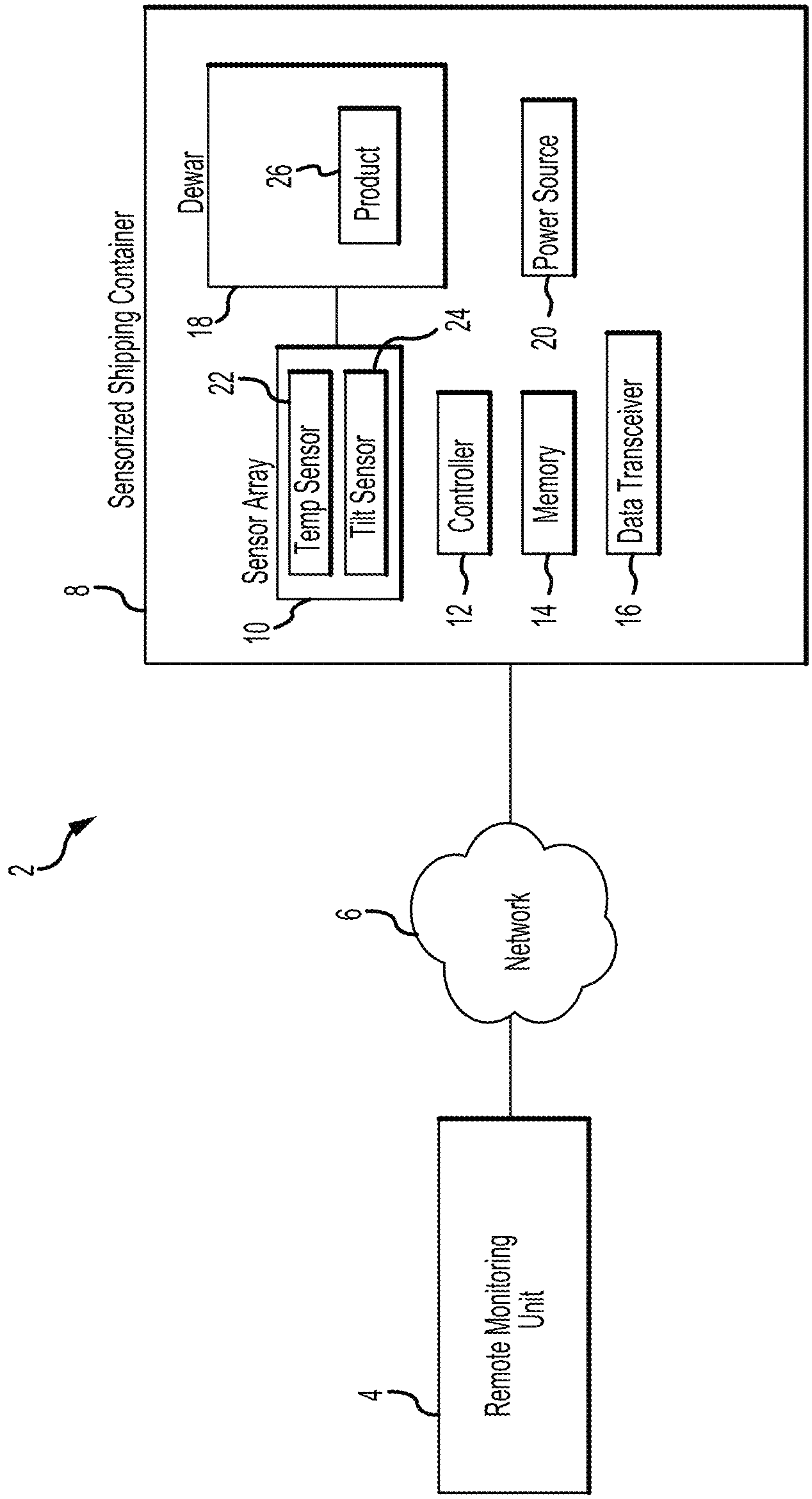
FIG. 1 is a block diagram illustrating the electronic monitoring system, in accordance with various embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized, and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Advances in cryopreservation technology have led to methods that allow low-temperature maintenance of a variety of cell types and molecules. Techniques are available for the cryopreservation of cultures of viruses and bacteria, isolated tissue cells in tissue culture, small multi-cellular organisms, enzymes, human and animal DNA, pharmaceuticals including vaccines, diagnostic chemical substrates, and more complex organisms such as embryos, unfertilized oocytes, and spermatozoa. These biological products must be transported or shipped in a frozen state at cryogenic temperatures to maintain viability. This requires a shipping enclosure that can maintain a cryogenic environment for up to 10 days and meet other shipping requirements such as being relatively impervious to mechanical shock and effects of directional orientation.

In addition to the already existing difficulties posed in shipping heat-sensitive biologicals, the International Air Transport Association (IATA) imposed new regulations which became effective in January 1995 pertaining to all shipments that include specimens containing infectious agents or potentially infectious agents. These regulations, endorsed by the United States Department of Transportation (DOT) and applicable to all public and private air, sea, and ground carriers, imposed greatly increased requirements upon shipping units to survive extensive physical damage (drop-testing, impalement tests, pressure containment tests, vibration tests, thermal shock, and water damage) without leakage and without fracture of the internal, primary receptacles (vials). Implementation of this regulation further complicated the shipping of frozen biologicals. Even though bioshippers are currently available using liquid nitrogen as a refrigerant, little innovation has taken place in the design of packaging for low-temperature transport. Current shippers are generally vulnerable to the physical damage and changes in orientation encountered during routine shipping procedures. Additionally, these shippers rarely comply with the IATA Dangerous Goods Regulation (effective January 1995 or as later amended). Commercial vendors have not developed or certified a cost-effective, standardized shipping unit with the necessary specimen capacity and hold time to meet user demands.

A fully charged shipper that is in use and containing samples (e.g., in the process of being handled and transported) may be used for a period of time, for example a static hold time. The static hold time may be the amount of time that the cryogenic container may be used and maintain proper temperature. Even though the static hold time is often promoted as being 20 days, if the container is tilted or positioned on its side, the hold time diminishes to hours as opposed to days. This may occur because the liquid nitrogen transitions to the gaseous (vapor) phase more rapidly resulting in outgassing. The liquid nitrogen can also simply leak out of the container when it is positioned on its side. The current cryogenic containers are promoted as being durable because they are of metal construction. However, rugged handling frequently results in the puncturing of the outer shell or cracking at the neck, resulting in loss of the high vacuum insulation. Thus, there is a need for a monitoring system for ensuring the temperature is maintained and notifications or alarms are used to properly make note of improper temperature. Further, there is a need for monitoring false alarms, where the temperature may increase, but not a rate or threshold that is the cause for an alarm. One concern is to have the ability to monitor the temperature of the Dewar and determine if the rise in temperature is cause for an alarm to be set. A false alarm may occur where there is a spike in the temperature of the Dewar, however the temperature quickly goes back to normal. A false alarm may have many causes, including an incorrect temperature reading or a temporary increase in temperature.

With the shipping of cryogenic material there is a need to ensure that the contents properly maintain certain temperatures. A sharp rise or fall in temperature may be damaging to the cryogenic contents. The cryogenic contents must be accurately and efficiently monitored. Where there is a rapid change in temperature an indication may be set to identify the change. There is a need for the monitoring system to efficiency monitor for issues while also recognizing false alarms.

The present system and method may solve the problem of incorrect false alarms while also ensuring proper indication where an alarm is needed. The system and method may identify a sharp rise in temperature over a period of time to indicate an alarm. The system and method may identify the tilt of the contents and the change in temperature.

The monitoring system may be used to monitor temperature sensitive contents in a shipping container. When temperature sensitive material is transported, an electrical temperature probe and monitoring system may be used to detect rapid increases and decreases in temperature. The system may monitor the temperature change over periods of time to determine if the contents in the shipping container are properly stored. A rapid change in temperature may cause an alarm or other indication to be transmitted.

In various embodiments, the system and method utilizes a tilt monitor and temperature probe to determine if there is a sufficient change in temperature and tilt to indicate an alarm. The system and method may also monitor for an indication of warming. A benefit of the described electric monitoring system is the decrease in false alarms.

In various embodiments, the tilt of a shipping container is monitored. A shipping package almost by definition needs to be functional in any position, including both lateral and inverted orientations. This is particularly true of smaller packages that encompass most of the packages that are shipped via package delivery services including parcel post, UPS®, FedEx®, etc. It is these services that are necessarily used if economical, reliable, and timely shipment and delivery is required. All currently available cryogenic shipping containers will spill some liquid cryogen if laid on their sides or inverted as one would anticipate happening in the commercial shipping environment. Most of these shipping containers include an internal, primary absorbent material that acts, with varying degrees of efficiency, to inhibit the amount of liquid cryogen that will be spilled; but none of them completely eliminates every spill potential as all depend on surface tension capillary forces to contain the liquid. In the Figures and the following more detailed description, numerals indicate various features of the invention, with like numerals referring to like features throughout both the drawings and the description.

Now, with reference to FIG. 1, an electronic monitoring system 2 is provided. This electronic monitoring system may operate to electronically monitor temperature-sensitive material inside a shipping container during shipment and provide alerts corresponding to measurements taken by sensors during the electronic monitoring. For example, a remote monitoring unit 4 may communicate with aspects of a sensorized shipping container 8 over a network 6. The remote monitoring unit 4 may store data associated with measurements taken by a temperature sensor 22 with sensors evaluating temperature or other measurements. Various methods discussed further herein will facilitate the identification of alarm statuses, such as when a temperature or other measurement exceeds a safe threshold for the product being shipped in the shipping container, and may further facilitate the identification of false alarm statuses, such as when a temperature or other measurement may initially indicate that a safe threshold for the product has been exceeded, but further analysis reveals that the measurement is not associated with environmental conditions having become unsafe for transportation of the product. As used herein, "safe"

conditions refer to those that facilitate shipping of the product without spoilage or degradation, whereas "unsafe" conditions refer to those that will lead to spoilage or degradation of the product and/or indicate that spoilage or degradation has already occurred.

With continuing reference to FIG. 1, the electronic monitoring system may include a remote monitoring unit 4. In various embodiments, the remote monitoring unit 4 may be a computerized monitoring unit that is external or internal to the shipping container 8. The remote monitoring unit 4 may be used to monitor the tilt and/or temperature of the shipping container and its contents.

Moreover, the electronic monitoring system may include a network 6. The network 6 may provide two-way data communication that can include a local network, a wide area network or some combination of the two. For example, an integrated services digital network (ISDN) may be used in combination with a local area network (LAN). In another example, a LAN may include a wireless link. A network link typically provides data communication through one or more networks to other data devices. For example, a network link may provide a connection through a local network to a host computer or to a wide area network such as the Internet. A local network and the Internet may both use electrical, electromagnetic, or optical signals that carry digital data streams. A computing system may use one or more networks to send messages and data, including program code and other information.

Finally, the electronic monitoring system may include a sensorized shipping container 8. The sensorized shipping container 8 may be a sensorized shipping container 8 designed to store contents at cryogenic temperatures. In various embodiments, the sensorized shipping container may contain a plurality of components deigned to perform various electronic monitoring steps.

With continuing reference to FIG. 1, the sensorized shipping container 8 may include a variety of associated components. For example, the sensorized shipping container may include a sensor array 10. The sensor array 10 may include a temperature sensor 22, a tilt sensor 24, an altitude sensor (not shown), a positional sensor (not shown), a humidity sensor (not shown), a light sensor (not shown), and/or a battery sensor (not shown). The temperature sensor 22 may comprise a thermocouple wire configured to measure temperature, or an optical temperature sensor, or any other component configured to measure temperature. The sensor array 10 may further comprise a tilt sensor 24. The tilt sensor 24 may include an accelerometer or gyroscope or any other sensor configured to measure orientation or movement. The tilt sensor 24 may be configured to measure the movement of the shipping container, including the speed of rotation. The tilt sensor 24 may measure the rotation on one or more axes. The altitude sensor can be configured to measure air pressure (e.g., a barometric sensor). The positional sensor can be configured to identify a location of the sensorized shipping container 8. A number of different types of positional sensors can be used alone or in combination with others. For example, a positional sensor can comprise one or more of a global positioning system (GPS) sensor, a Wi-Fi positioning system (WPS), a cellular location positioning system (CPS), a Bluetooth positioning system (BPS), a radio-frequency identification (RFID) positioning system, or another suitable positioning system. The humidity sensor can be configured to detect and and/or measure changes in local humidity. A number of different types of humidity sensors can be used. For example, a humidity sensor can comprise a capacitive humidity sensor, a resistive humidity, a thermal humidity sensor, or another suitable humidity sensor. The light sensor can be configured to detect and and/or measure light intensity. A number of different types of light sensors can be used. For example, a light sensor can comprise a photovoltaic light sensor, a photoresistor light sensor, a photoconductive light sensor, or another suitable light sensor. The battery sensor can be configured to detect and and/or measure one or more of battery capacity (e.g., battery charge percentage), battery voltage, and/or battery cycles.

The sensorized shipping container 8 may include a controller 12. The controller 12 may be in communication with the sensor array 10 and the memory 14, wherein the controller 12 may receive temperature measurements and tilt measurements. The controller 12 may transmit the temperature measurements and tilt measurements to the memory 14. The controller 12 may comprise a processor or other data processing device.

The sensorized shipping container 8 may include memory 14. The memory may include one or more of random access memory ("RAM"), static memory, cache, flash memory and any other suitable type of storage device that can be coupled to a bus or other communication mechanism. In various embodiments, memory 14 and one or more controllers 12 may be fabricated in a common device and/or collocated in a common package. Memory 14 can be used for storing instructions and data that can cause one or more controllers 12 to perform a desired process. Memory 14 may be used for storing transient and/or temporary data such as variables and intermediate information generated and/or used during execution of the instructions by processor. The memory may comprise one or more separate non-volatile storage device, such as read only memory ("ROM"), flash memory, memory cards or the like. The memory 14 may be connected to a data transceiver 16 or other communication mechanism. The memory 14 can be used for storing configuration, and other information, including instructions executed by controller 12.

The sensorized shipping container 8 may include a data transceiver 16. The data transceiver 16 may be a data communication device, a wireless transceiver, radio transmitter or any other form of data transceiver. In various embodiments, the data transceiver 16 may be configured to transmit and/or receive data between the sensorized shipping container 8 and a remote monitoring unit 4. In various embodiments, the data transceiver 16 may be configured to transmit and/or receive data via a network 6. In various embodiments, the data transceiver 16 may be configured to both transmit and receive data. In various embodiments, the data transceiver 16 may configured to only transmit data or only receive data. In various embodiments, the data transceiver 16 may be a high-speed universal serial bus (USB), Firewire or other such communication mechanism.

The sensorized shipping container 8 may include a Dewar 18 containing a product 26. A Dewar 18 may be a cryogenic storage container, such as a vacuum flask used for storing cryogenic materials. In some embodiments, a Dewar may have multiple vacuum sealed walls. The Dewar 18 may be configured to hold the product 26.

The sensorized shipping container 8 may include a power source 20. For example, the power source 20 may include a battery, a solar charging device, a thermal or other energy harvesting charging device, and/or any other source of electrical power as desired.

Figure 2:
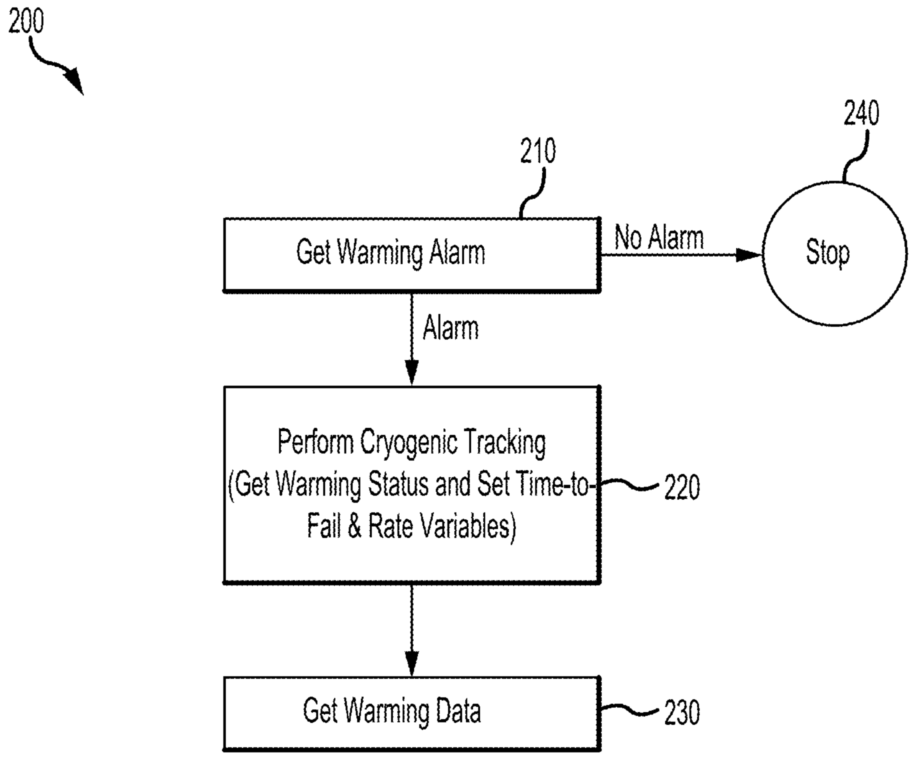
FIG. 2 is a flowchart illustrating the method of electronic monitoring, in accordance with various embodiments.
Figure 3:
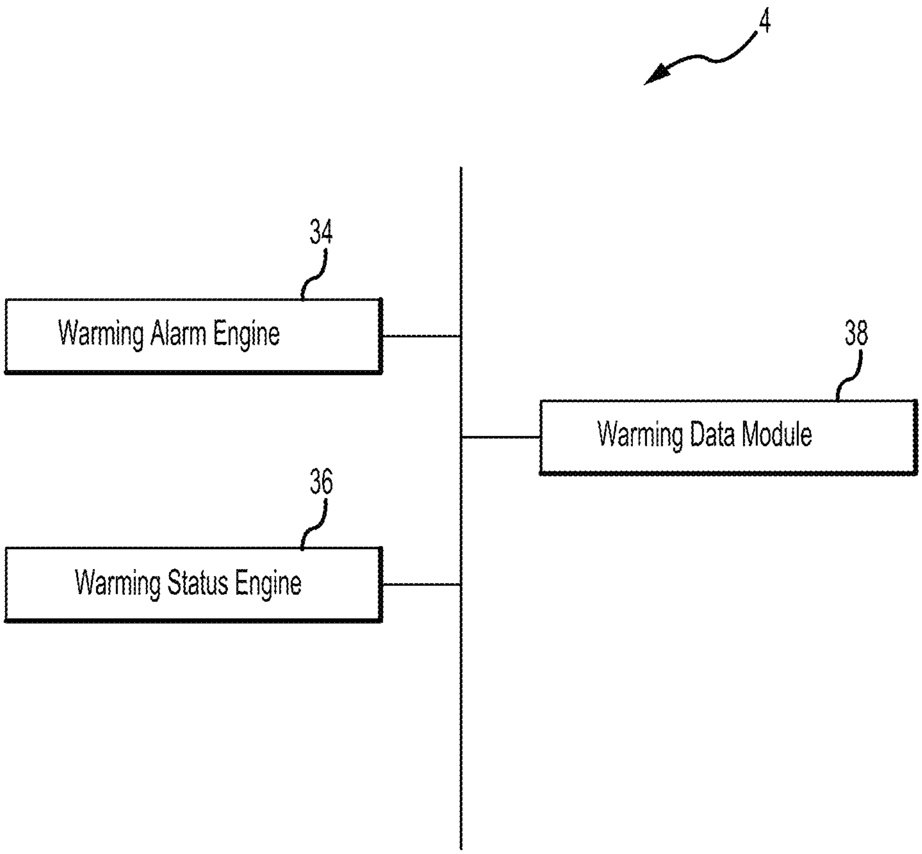
FIG. 3 is a flowchart illustrating the logical aspects of the remote monitoring unit that may perform the method of electronic monitoring, in accordance with various embodiments.

Having discussed aspects of the electronic monitoring system 2, attention is now directed to a combination of FIGS. 1 and 2 for a discussion of a method of electronic monitoring 200. The method of electronic monitoring 200 may have a variety of steps. For instance, the remote monitoring unit 4 may query the controller 12 of the sensorized shipping container 8 to return data corresponding to whether a warming alarm should be triggered for the sensorized shipping container 8 so that an operator is alerted to a condition of the product 26 in the Dewar 18. In further instances, the controller 12 of the sensorized shipping container 8 may transmit an alert to the remote monitoring unit 4 rather than responding to a query. With brief reference to a combination of FIGS. 1, 2, and 3, one may appreciate that the remote monitoring unit 4 thus may have logical aspects that perform different logical steps. While these logical aspects are shown separately in FIG. 3, one may appreciate that the logical aspects may be combined or differently arranged. For instance, a warming alarm engine 34 comprises a combination of machine instructions that cause the remote monitoring unit 4 to get a warming alarm status (block 210). In response to a warming alarm status not being set, the process stops (block 240), whereas, in response to the warming alarm status being set to any different status (discussed further herein), a warming status engine 36 of the remote monitoring unit 4 operates to perform further analysis, such as setting a time-to-fail calculation and a warming rate calculation so that an operator may determine how rapidly conditions of the product 26 in the Dewar 18 may become unsafe (block 220). Finally, a warming data module 38 of the remote monitoring unit may get warming data, meaning, the warming data module 28 may evaluate historical data associated with the Dewar 18 and the product 26 and implement machine learning methods to further evaluate whether the product is in a safe or unsafe condition in view of the data collected by the sensor array 10 (block 230).

Continuing the discussion of the electronic monitoring system 2, attention is directed to the warming alarm engine 34 of the remote monitoring unit 4, more specifically. The warming alarm engine 34 implements a collection of data filters and sets a failure status flag in response to the data filters. The failure status flag may be set to a status corresponding to a present condition of the product 26 in the Dewar. Thus, with reference to FIG. 1 and FIGS. 4A-B, a method of electronically monitoring temperature-sensitive material inside a shipping container during shipment 400 is provided. The method may include a sequential application of data filters. Extending simultaneous reference to FIGS. 1, 4A-B, and 5, one may also appreciate that the warming alarm engine 34 may contain various electronic components operating in concert to execute the method 400.

For example, a remote monitoring unit 4, and specifically, a warming alarm engine 34 of a remote monitoring unit may include a remote monitoring unit processor 51. The remote monitoring unit processor 51 may be configured to provide instructions to and receive data from other aspects of the warming alarm engine 34 to execute the method 400.

The remote monitoring unit processor 51 may receive sensor array data 52. Sensor array data 52 may include data from a sensor array 10. The sensor array data 52 may be data from the temperature sensor 22 and/or the tilt sensor 24. The sensor array data may, thus comprise both temperature data and tilt data. The sensor array data 52 may include sampled values of the monitored tilt of the shipping container over a duration of time. Further, in various embodiments, the sensor array data 52 may comprise a maximum tilt value over a period of time corresponding to the largest sample and a medium tilt value over a period of time corresponding to the smallest sample. In various embodiments, the remote monitoring unit processor 51 may store the sensor array data 52 in a sensor memory 53, for future retrieval and processing. The remote monitoring unit processor 51 may be configured to process sensor array data 52 to sub-divide temperature sample array into sub-arrays associated with corresponding sub-durations of time of the first duration of time. Further, the remote monitoring unit processor 51 may calculate a rate of change of temperature for each sub-array associated with each corresponding sub-duration, calculate a rate of change of temperature for the temperature sample array over the first duration of time, calculate an amount of change of temperature for each sub-array associated with each corresponding sub-duration, and calculate an amount of change of temperature for the temperature sample array over the first duration of time. The remote monitoring unit processor 51 may calculate the rate of change temperature over various time increments.

The remote monitoring unit processor 51 may receive filters to apply to the sensor array data 52 from a filter repository 58 and may apply the filters to various data. Applying the filters may be termed "filtering" elsewhere herein. For example, in various embodiments the filter repository 58 may apply a plurality of filters to the maximum tilt value, the minimum tilt value, a present temperature value, the amount of change of temperature for at least one sub-array associated with the corresponding sub-duration, the amount of change of temperature for the temperature sample array over the first duration of time, the rate of change of temperature for at least one sub-array associated with the corresponding sub-duration, and the rate of change of temperature for the temperature sample array over the first duration of time. The filters implemented by the remote monitoring unit processor 51 may be implemented in parallel. In further instances, the filters may be implemented in sequence. In yet further instances, filters may be implemented in different combinations and in both parallel and in sequence. Application of the sequence of filters set out in FIGS. 4A-B may be aspects of obtaining a warming alarm (block 210) in FIG. 2.

The remote monitoring unit processor 51 may set a failure status flag in response to applying the filters and store the failure status flag in a status flag memory 54. In various embodiments, a status flag is set to a state and stored in the status flag memory in response to the filtering, wherein the state comprises one of: not set, alarm, no alarm, warm, and false alarm.

Finally, the remote monitoring unit processor 51 may include a human-machine interface device 56 configured to display human readable indications of the failure status flag. The human-machine interface device 56 may be a visual display, data port, or other device for interfacing data. The human-machine interface device 56 may be a data communication device that connects via a network to an additional device.

Figure 4A:
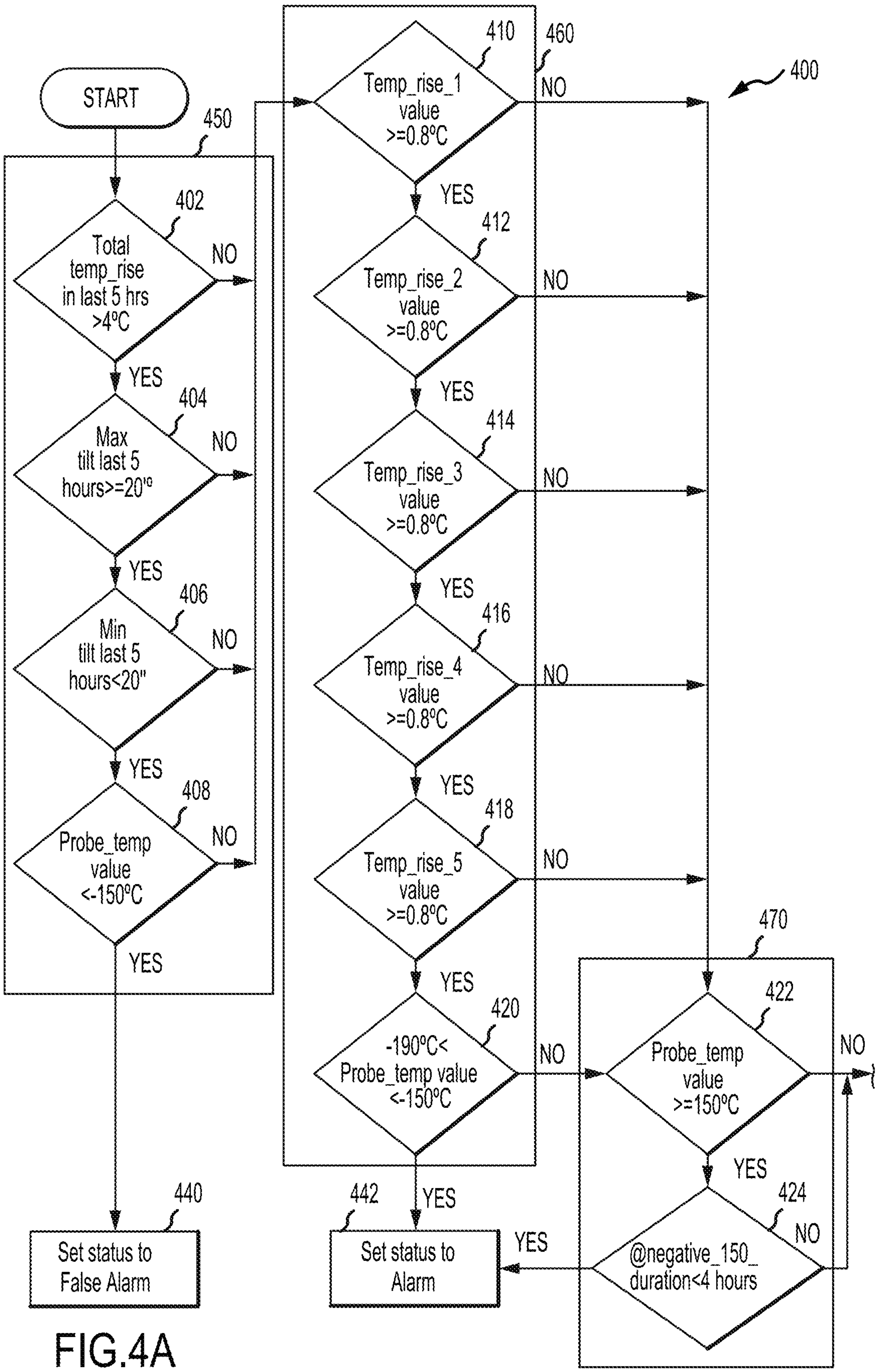
FIGS. 4A-B are a flowchart illustrating aspects of a method of electronically monitoring temperature-sensitive material inside a shipping container during shipment, in accordance with various embodiments.
Figure 4B:
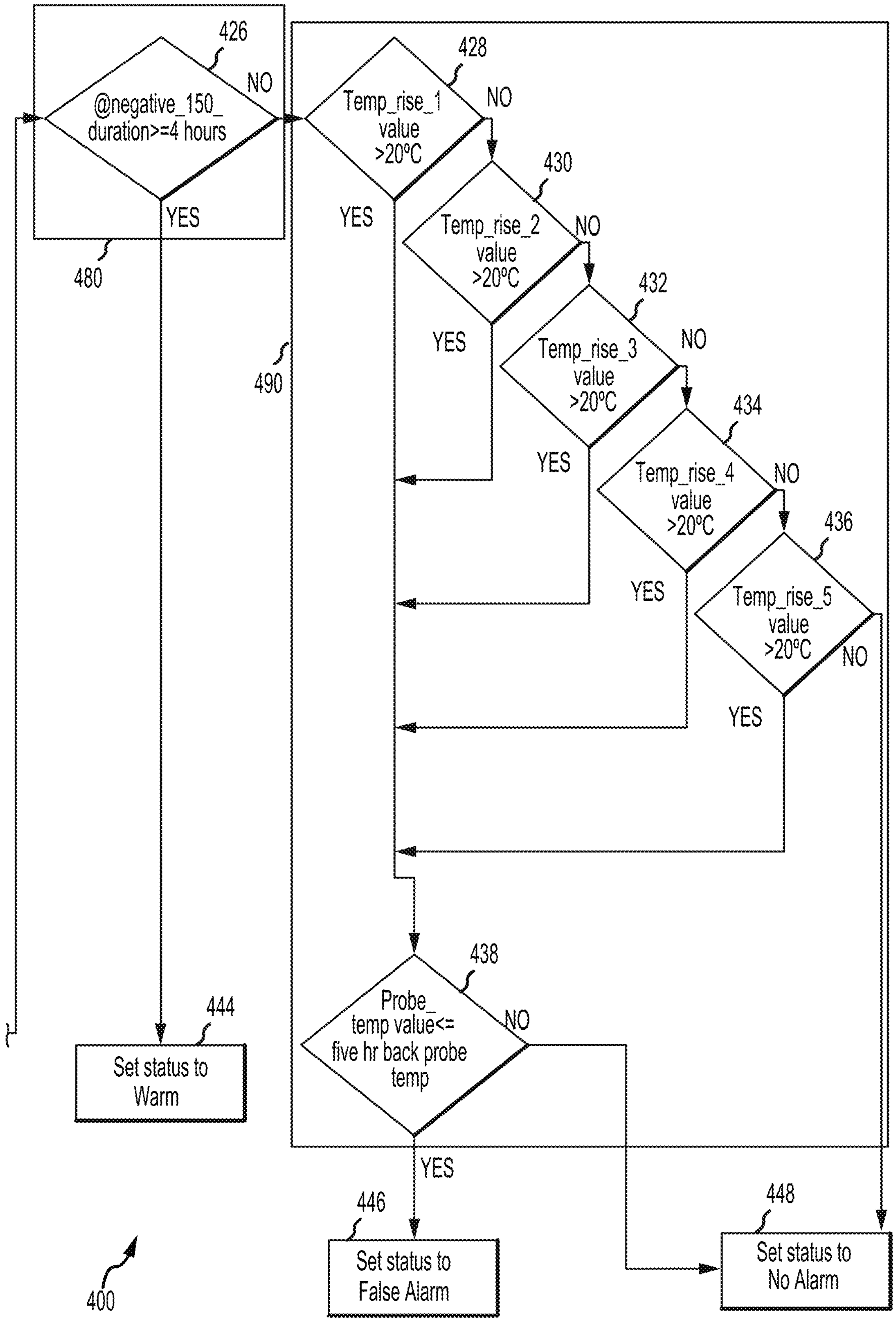
Figure 5:
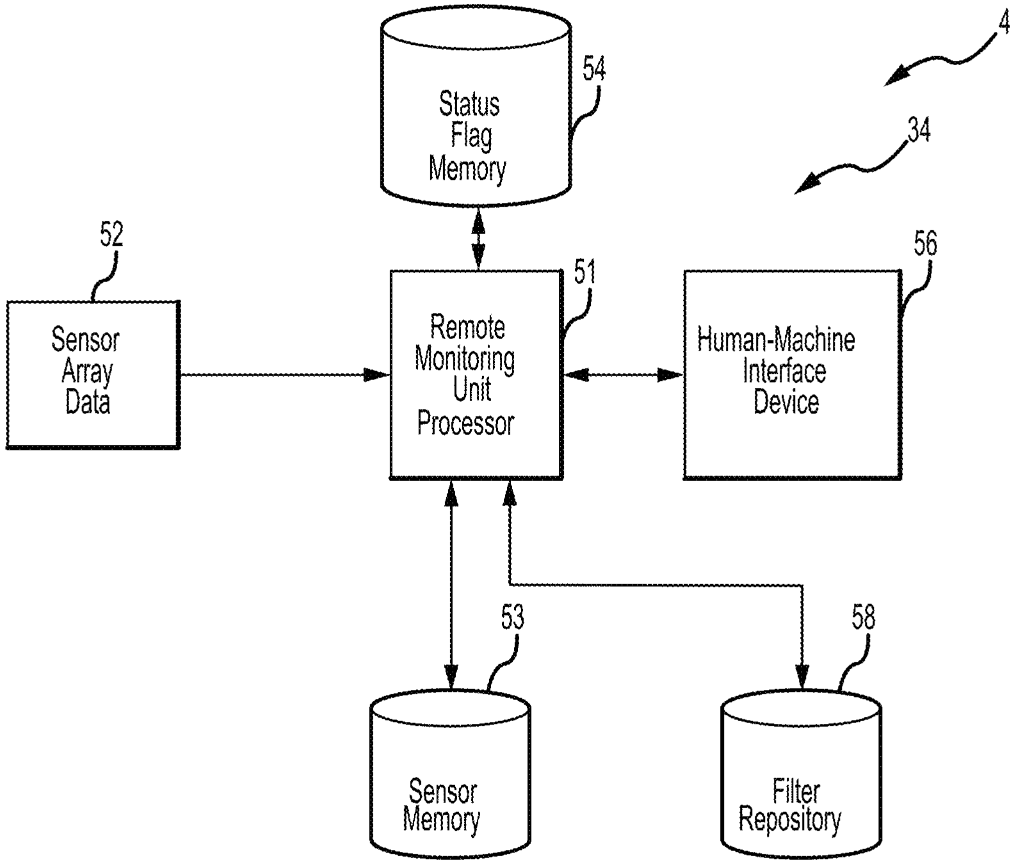
FIG. 5 is block diagram illustrating aspects of the warming alarm engine of FIG. 3 and various electronic components that perform the method of FIGS. 4A-B, in accordance with various embodiments.

In various embodiments, and with primary reference to FIGS. 4A-B and periodic reference to FIG. 5, a method of electronically monitoring temperature-sensitive materials inside a shipping container during shipment 400 may comprise aspects as follows. Such a method may be an aspect of block 210 of FIG. 2. In various embodiments, the warming alarm engine 34 may contain various electronic components operating in concert to perform the method 400. The method of electronically monitoring shipment 400 may include one or more filtering steps 450, 460, 470, 480, 490. For example, the one or more filtering steps may be used to monitor the shipment 200 and determine whether there is the need to signal a status indicator. In various embodiments, the method 400 may include a first filter 450, second filter 460, third filter 470, fourth filter 480, and fifth filter 490.

In various embodiments, the state of the failure status flag may be set to false alarm 440 in response to each condition of a first set of conditions (402, 404, 406, and 408) that make up the first filter 450 being true. In various embodiments, the first filter 450 may contain one or more of the first set of conditions 402, 404, 406, and 408. In various embodiments, the first set of conditions (402, 404, 406, and 408) may comprise the amount of change of temperature for the temperature sample array over the first duration of time being greater than a first temperature rate threshold (block 402), a maximum tilt value during the first duration of time being greater than or equal to a maximum tilt limit (block 404), a minimum tilt value during the first duration of time being less than or equal to a minimum tilt limit (block 406) and a present temperature value being less than a first upper temperature threshold (block 408). For example, the maximum tilt and minimum tilt are measurements of the amount that a component of the shipping container has rotated in relation to an axis. The tilt may be measured using a tilt sensor 24.

In various implementations of the first filter 450, the maximum tilt and the minimum tilt may be measured over a period of time. The maximum tilt over that time period may exceed a maximum tilt limit, however the minimum tilt measured may remain below a minimum tilt limit. Moreover, the temperature may not exceed a temperature threshold. In response to this set of conditions, the false alarm may be set.

Further, in various implementations of the first filter, the first temperature threshold may be four degrees, the first duration may be five hours, the maximum tilt limit may be 20 degrees, and the minimum tilt limit may be 20 degrees. In various embodiments, the duration of time may be greater than or less than five hours. The temperature may be logged. For instance, the temperature may be logged for a previous five hours, and the recorded temperatures stored. The tilt measurements may be logged. For instance, the tilt measurements may be logged for a previous five hours, and the recorded tilt measurements may be stored. The recorded temperatures may include the first upper temperature threshold. As noted above, the first temperature threshold may be measured using a temperature probe or sensor. The sensor may communicate with a memory and store the temperature measurements. The memory may store a plurality of temperature measurements over various time increments. The sensor may continuously monitor the temperature or sample the temperatures at various time increments. For example, the temperature sensor or probe may sample the temperature in five minute increments. Furthermore, the first upper temperature threshold may be −150 degrees Celsius. The first filter 450 may be used to determine if the tilt and temperature change of the shipping container is sufficient to set the status indicator to a false alarm. The first filter 450 may be arranged at any point in the monitoring process, such as after the second filter 460, third filter 470, fourth filter 480, or fifth filter 490. The first filter 450 may be arranged first in the monitoring process in order to identify the false alarms prior to an alarm being set. For example, where a tilt and temperature may be sufficient to meet the alarm but actually correspond to a false alarm rather than an actual alarm condition, the first filter 450 will set the status indicator to false alarm 440 rather than the second filter 460 reviewing a second set of conditions.

In various embodiments, in response to the at least one condition of the first set of conditions (402, 404, 406, and 408) being false, a second filter 460 may be applied. In various embodiments, the second filter 460 may comprise a second set of conditions (410, 412, 414, 416, 418, 420) and the state of the failure status flag may be set to alarm 422 in response to the second set of conditions (410, 412, 414, 416, 418, 420) being all true and set to not set in response to at least one condition of the second set of conditions (410, 412, 414, 416, 418, 420) being false. The second set of conditions (410, 412, 414, 416, 418, 420) may comprise an amount of change of temperature for each sub-array being greater than or equal to a minimum temperature increase threshold (block 410, block 412, block 414, block 416, and block 418) and a present temperature value being between a first upper temperature threshold and a first lower temperature threshold (block 420). The minimum temperature increase threshold may be 0.8 degrees Celsius. Each sub-array may be associated with a sub-duration of time equal to one hour. The first duration of time may equal five hours. The first upper temperature threshold may be −150 degrees Celsius. The first lower temperature threshold may be −190 degrees Celsius.

In various embodiments, in response to the at least one condition of the second set of conditions (410, 412, 414, 416, 418, 420) being false, a third filter 470 may be applied. The third filter 470 may comprise a third set of conditions (422, 424) and the state of the failure status flag may be set to alarm 442 in response to the third set of conditions being all true and set to not set in response to at least one condition of the third set of conditions (422, 424) being false. The third set of conditions (422, 424) may comprise the present temperature value being greater than a first upper temperature threshold (block 422) and the temperature sample array containing temperatures that are each above the first upper temperature threshold for a number of samples corresponding to less than a second duration of time (block 424). The second duration of time may be four hours. The first duration of time may be five hours. The first upper temperature threshold may be −150 degrees Celsius.

In various embodiments, in response to the at least one condition of the third set of conditions (422, 424) being false, a fourth filter 480 may be applied. The fourth filter 480 may comprise a fourth set of conditions (426) and wherein the state of the failure status flag may be set to warm 444 in response to the fourth set of conditions (426) being all true and set to not set in response to at least one condition of the fourth set of conditions (426) being false. The fourth set of conditions (426) may comprise the temperature sample array contains temperatures that are each above the first upper temperature threshold for a number of samples corresponding to greater than or equal to a second duration of time (block 426). The second duration of time may be four hours, and the first upper temperature threshold may be −150 degrees Celsius. In some embodiments, the status flag is set to warm to indicate that the contents of the shipping container are warm. For example, the temperature of the shipping container is above the upper threshold limit for more than a period of time. For example, where the temperature is above −150 for more than 4 hours the status may be set to warm. Setting the status to warm indicates that the conditions in a Dewar of the container have become irreversibly inhospitable to the contents of the Dewar such that the contents can be presumed spoiled. In contrast, a status of alarm indicates that unless corrective action is taken, the contents can be presumed spoiled, but have not yet spoiled.

In various embodiments, in response to the at least one condition of the fourth set of conditions (426) being false, a fifth filter 490 may be applied. The fifth filter 490 may comprise a fifth set of conditions (428, 430, 432, 434, 436, 438) and wherein the state of the failure status flag is set to false alarm 446 in response to the fifth set of conditions (428, 430, 432, 434, 436, 438) being all true and set to no alarm 448 in response to at least one condition of the fifth set of conditions (428, 430, 432, 434, 436, 438) being false. The fifth set of conditions (428, 430, 432, 434, 436, 438) may comprise the amount of change of temperature for at least one of the sub-arrays exceeding or equaling a sub-array amount limit (block 428, 430, 432, 434, 436). The fifth set of conditions (428, 430, 432, 434, 436, and 438) may also comprise the present temperature value being less than or equal to a sampled value of the monitored temperature inside the shipping container collected the first duration of time in the past (block 438). Each sub-duration of time may be one hour, the first duration of time may be five hours, and the sub-array amount limit may be 20 degrees Celsius. A remote monitoring controller may read the state of the failure status flag and display a human-readable alarm corresponding to the state of the failure status flag. For example, the fifth filter 490 may be used to determine if there is a sharp rise in the temperature of the shipping container over a period of time, such as the previous five hours. The fifth filter 490, when some or all of the conditions are met, will set the failure status flag to false alarm 446 where there is a sharp rise, however the rise is not significant enough to cause the contents of the shipping container be spoiled or potentially spoiled, thus an alarm is not necessary. In various embodiments, the fifth filter 490 may comprise measuring the temperature rise over various time increments, where there is a sharp rise in temperature. For example, each of the fifth set of conditions (428, 430, 432, 434, 436) may be used to determine if the increase in temperature that hour was more than 20 degrees. In response to there being a rise greater than 20 degrees, the temperature is then compared to a temperature some time in the past, for instance, five hours in the past. If the present temperature is less than or equal to the temperature in the past, then the rise may be considered associated with a false alarm and the failure status flag set to false alarm 446.

The discussion above has related to aspects of FIG. 2, such as block 210 performed by warming alarm engine 34 (FIG. 3) of the remote monitoring unit 4 (FIG. 1). Further discussion below relates to additional aspects of FIG. 2, such as block 220 performed by the warming status engine 36 (FIG. 3) of the remote monitoring unit 4 (FIG. 1). In various embodiments, and with primary reference for FIG. 6, and continued reference to FIGS. 1-5, a method of cryogenic tracking 220 may be performed. For instance, a method of cryogenic tracking 220 may be executed by the warming status engine 36. In some embodiments, the method of cryogenic tracking 220 may be performed following the method of electronically monitoring temperature-sensitive materials inside a shipping container during shipment 400. In some embodiments, aspects may be performed in parallel. While these logical aspects are shown separately in FIG. 6, one may appreciate that the logical aspects may be combined or differently arranged.

The method of cryogenic tracking 220 may have a variety of elements. The method of cryogenic tracking 220 may include determining if a warming alarm engine 34 (FIG. 3) has set a failure status flag to an alarm status (block 602). For instance, the method 400 (FIGS. 4A-B) may result in setting the failure status flag to alarm 442, 446 (FIGS. 4A-B). If the status flag is not set to alarm, then the method of cryogenic tracking 220 may end (block 612). If a warming alarm engine has set a failure status flag to alarm, then the method will include calculating a warming rate and setting a rate flag (block 608. Moreover, if the warming alarm engine has set a failure status flag to alarm, the method will include checking whether a current temperature is greater than a threshold ("tracking temperature threshold") (block 604). In response to the current temperature exceeding a tracking temperature threshold, the method includes predicting a time to failure (block 610). A time to failure may be a duration of time, following which, the temperature-sensitive material inside the shipping container can be expected to have spoiled. Alternatively, in response to the current temperature not exceeding the tracking temperature threshold, the method may continue with setting the warming failure status flag to false alarm (block 606). Thus, one may appreciate that both the method of cryogenic tracking 220 and the method of electronically monitoring temperature-sensitive materials inside the shipping container during shipment 400 (FIGS. 4A-B) may set a status of a failure status flag.

Block 610 (predict time to failure) may include further aspects. For instance, such a prediction may include performing calculations to establish a predicted time. Such a calculation may be performed using the difference in the probe temperature over time. For instance, the difference between the current probe temperature and an upper threshold temperature may be compared to the difference in the current probe temperature and the probe temperature at a previous time. The resulting value is then divided by the amount of time since the previous time. The resulting value will determine the amount of time until the temperature probe will reach a temperature above the upper temperature threshold. For example, the difference between the current probe temperature and −150 degrees divided by the difference in the probe temperature and the probe temperature 14 hours ago, divided by 14 hours, will result in the amount of time until the probe temperature will rise above −150 degrees.

Additionally, in some embodiments, block 608 (calculating a warming rate and setting a rate flag) may involve further aspects. For example, where temperature is increasing at a rate below a slow temperature rise threshold, the warming rate flag may be set to slow, where temperature is increasing at a rate below a normal temperature rise threshold the warming rate flag may be set to normal, and if neither of the conditions are met the warming rate flag will be set to fast. Thus, where the temperature of the cryogenic shipping container is increasing at a rate above normal, then the warming rate flag will be set to fast.

In various embodiments, a predictive algorithm is applied to historical warming data (block 230, FIG. 2) and executed by a warming data module 38 (e.g., Cryoportal). Further aspects of the warming prediction aspect associated with machine learning and/or artificial intelligence are illustrated in FIG. 7, which is described below.

Figure 6:
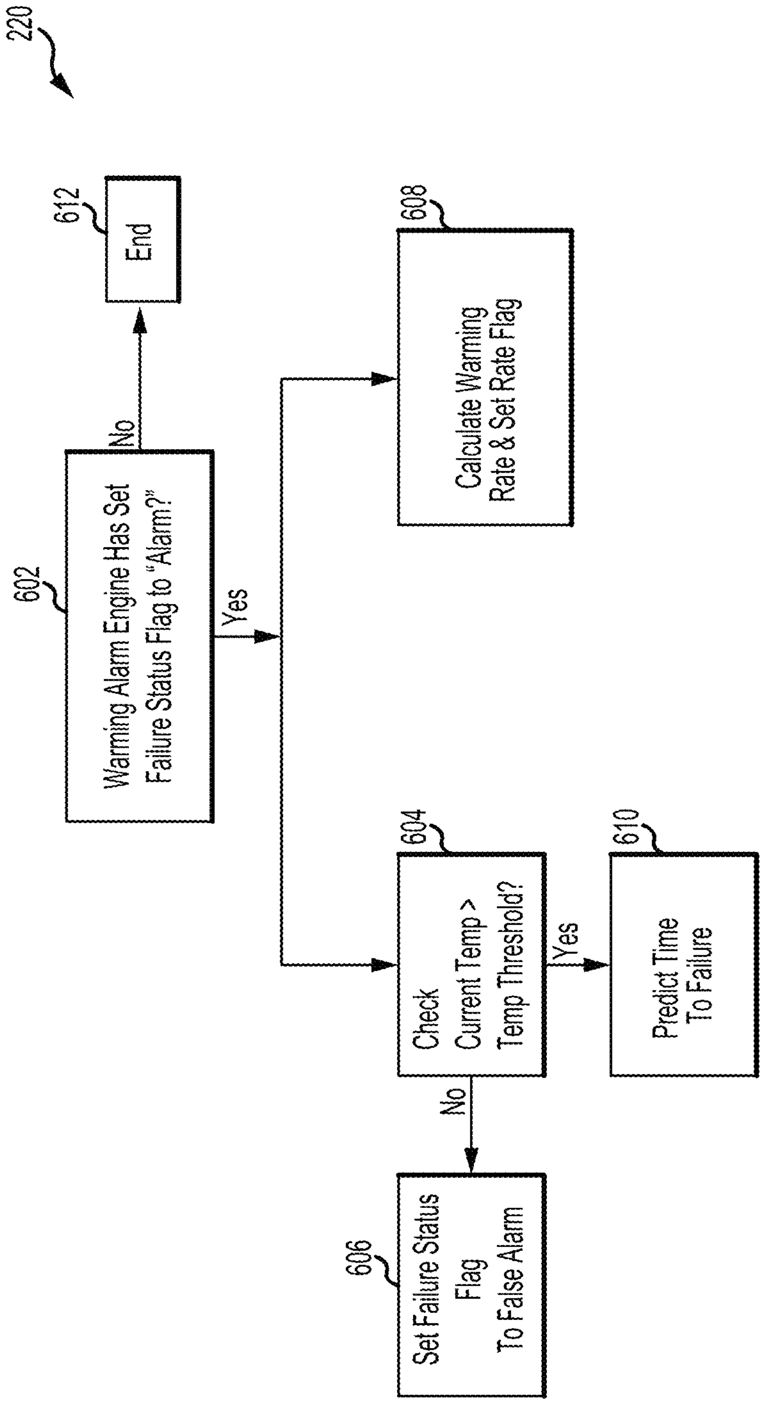
FIG. 6 is a flowchart illustrating further aspects of elements of the method provided in FIG. 2.
Figure 7:
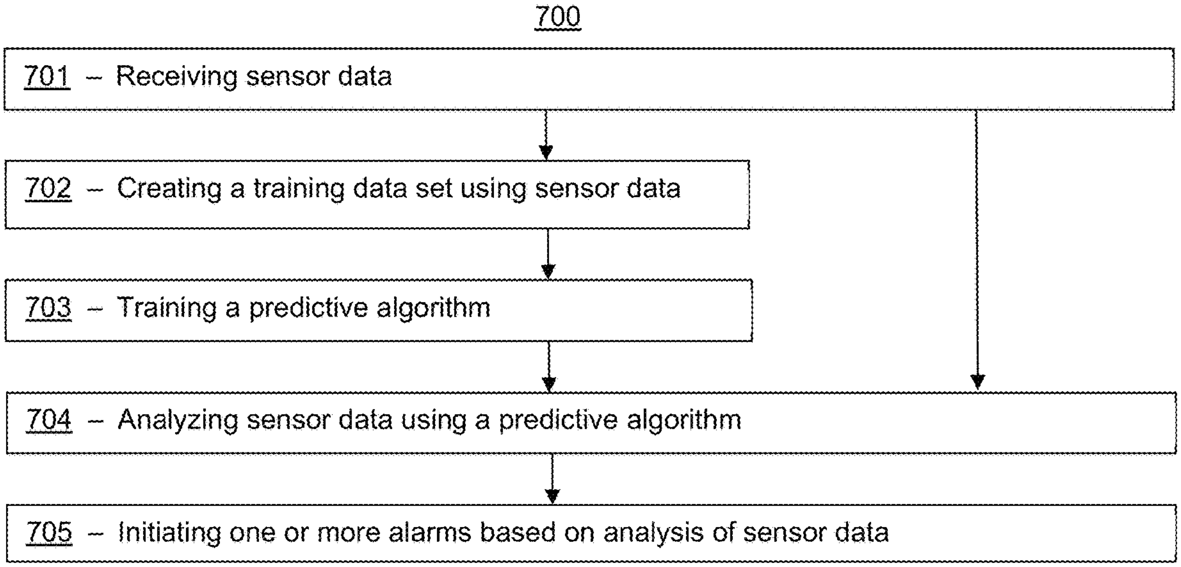
FIG. 7 is a flowchart illustrating further aspects of elements of the method provided in FIG. 2.

Turning ahead in the drawings, FIG. 7 illustrates a flow chart for a method 700, according to an embodiment. Method 700 is merely exemplary and is not limited to the embodiments presented herein. Method 700 can be employed in many different embodiments or examples not specifically depicted or described herein. In some embodiments, the activities of method 700 can be performed in the order presented. In other embodiments, the activities of method 700 can be performed in any suitable order. In still further embodiments, one or more of the activities of method 700 can be combined or skipped. In many embodiments, all or a portion of monitoring system 2 (FIG. 1) can be suitable to perform method 700 and/or one or more of the activities of method 700. In these or other embodiments, one or more of the activities of method 700 can be implemented as one or more computer instructions configured to run at one or more processing modules and configured to be stored at one or more non-transitory memory storage modules. Such non-transitory memory storage modules can be part of a computer system such as remote monitoring unit 4 (FIG. 1) and/or memory 14 (FIG. 1). The processing module(s) can be similar or identical to the processing module(s) described above with respect to remote monitoring unit 4 (FIG. 1) and/or controller 12 (FIG. 1). In some embodiments, method 700 can be performed in parallel, before, after, or as a part of method 200 (FIG. 2), method 400 (FIGS. 4A-4B), and/or method 220 (FIG. 6). In various embodiments, one or more activities of method 700 can be inserted into and/or combined with all of or portions of method 200 (FIG. 2), method 400 (FIGS. 4A-4B), and/or method 220 (FIG. 6).

In many embodiments, method 700 can comprise an activity 701 of receiving sensor data. In various embodiments, sensor data can be received from one or more sensors in sensor array 10 (FIG. 1). In various embodiments, sensor data can be received at periodic intervals and/or streamed continually to a predictive system. For example, sensor data can be received every 5 minutes. In this way, the techniques described herein can beneficially and more accurately make determinations based on dynamic information that describes current conditions and/or conditions analyzed in the context of what has occurred in a time period before a prediction is made. Receiving up-to date data from the sensors can also avoid problems with stale and/or outdated predictive algorithms by continually updating. In these or other embodiments, sensor data points can be referred to as one or more features of a predictive algorithm.

In many embodiments, sensor data can be managed by real-time stream processing software (e.g., Apache Kafka®). In various embodiments, real-time stream processing software can be configured to divide one or more streams of sensor data into various categorizations and subcategorizations (known as "topics" and "partitions" in an Apache Kafka® managed system) based on their content. In these or other embodiments, sensor data can be stored in one or more databases for further processing and/or later retrieval. In many embodiments, remote monitoring unit 4 (FIG. 1) and/or sensorized shipping container 8 (FIG. 1) can be configured to communicate with one or more databases storing sensor data. For example, the one or more databases can store past (e.g., historical) readings from sensor array 10 (FIG. 1). These readings can be tied to a specific sensorized shipping container (e.g., sensorized shipping container 8 (FIG. 1)) or can be de-identified. In some embodiments, data can be deleted from a database when it becomes older than a maximum age. In many embodiments, a maximum age can be determined by an administrator of the system. In various embodiments, data collected in real-time can be streamed to a database for storage.

In some embodiments, method 700 can optionally comprise an activity 702 of creating a training data set using sensor data. Generally speaking, a training data set can comprise a grouping of data points that is used to train a predictive (e.g., machine learning) algorithm. Training data can come in a number of forms. For example, training data can be labeled (e.g., annotated) or unlabeled. For example, data received from sensor array 10 can be labeled with a status of sensorized shipping container 8 (FIG. 1) associated with the data. In many embodiments, a status of a shipping container can comprise a variable indicating whether the shipping container is suitable for shipping or whether it needs repair. In various embodiments, a needs repair label can be subdivided into multiple different groupings representing various types of repairs. For example, a sensorized shipping container may need to have its refrigerant (e.g., liquid nitrogen) recharged, its battery recharged, its structure repaired, etc. In various embodiments, a training data set can comprise a mixture of labeled and unlabeled data. In many embodiments, sensor data can be converted into vector format before it is labeled. For example, sensor readings can be concatenated together to create a vector.

In some embodiments, method 700 can optionally comprise an activity 703 of training a predictive algorithm. In various embodiments, activity 703 can be performed concurrently, after, before, and/or in response to one or more of activities 701 and/or 702. For example, activity 703 can be performed while sensor data is received and/or after a training data set is created. As another example, activity 702 can be skipped and a predictive algorithm can be trained on an already assembled training data set. In some embodiments, training a predictive algorithm can comprise estimating internal parameters of a model configured to identify shipping containers that are in need of or will soon be in need of repair and/or replacement. For example, a weight of one or more features can be adjusted. In this way, the influence the one or more features have on a prediction can be increased or decreased. In various embodiments, a predictive algorithm can be trained using unlabeled and/or labeled training data, otherwise known as a training dataset. In the same or different embodiments, a pre-trained predictive algorithm can be used, and the pre-trained algorithm can be re-trained on training data. In some embodiments, a predictive algorithm can also consider both historical and dynamic input from sensorized shipping container 8 (FIG. 1). In this way, a predictive algorithm can be trained iteratively as data from sensorized shipping container 8 (FIG. 1) is added to a training data set. In many embodiments, a predictive algorithm can be iteratively trained in real time as data is added to a training data set. In various embodiments, a predictive algorithm can be trained, at least in part, on a single shipping container's (e.g., sensorized shipping container 8 (FIG. 1)) sensor data or the shipping container's sensor data can be weighted in a training data set. In this way, a predictive algorithm tailored to a single shipping container can be generated. In the same or different embodiments, a predictive algorithm tailored to a single shipping container can be used as a pre-trained algorithm for a similar shipping container. In several embodiments, due to a large amount of data needed to create and maintain a training data set, a predictive algorithm can use extensive data inputs to predict a status of a shipping container. Due to these extensive data inputs, in many embodiments, creating, training, and/or using a predictive algorithm configured to predict a status of a shipping container cannot practically be performed in a mind of a human being.

Generally speaking, a predictive algorithm can comprise a computerized set of steps configured to determine future and/or current status of a shipping container. For example, a predictive algorithm can determine whether a shipping container is currently in need of repair and/or whether it will need repair in the future. A number of different types of predictive algorithms can be used in method 700.

In many embodiments, a predictive algorithm can comprise a stochastic model. Generally speaking, a stochastic model can be configured to estimate a probability of a shipping container being in a specific state by allowing for random variation of data received from sensorized shipping container 8 (FIG. 2). In many embodiments, data received from sensorized shipping container 8 (FIG. 2) can be modeled as a time series of data points. In this way, a variety of time series forecasting techniques can be used to predict a status of a shipping container. For example, autoregressive models, integrated models, and/or moving average models can be used to predict a status of a shipping container.

In many embodiments, an autoregressive (AR) model and a moving average (MA) model can be used in combination to predict a status of a shipping container. In some embodiments, this combined model can be referred to as an autoregressive moving average (ARMA) model. When compared with pure AR and MA models, ARMA models provide a more effective linear model of stationary time series because an ARMA model is capable of modeling shipping container status with fewer inputs than AR or MA models in isolation. In various embodiments, an AR portion of an ARMA model can be configured to predict a future value of a variable based on past values of the variable, otherwise known as lags. A number of lags used to predict the future value can be referred to as an order of the AR model. For example, a tenth order AR portion of an ARMA model would use ten lags to predict a future value. In many embodiments, an AR portion of an ARMA model can be represented by an equation comprising:

$$X_t = \sum_{i=1}^{p} \varphi_i X_{t-i} + \varepsilon_t$$

In these embodiments, $X_t$ can comprise a predicted value of sensor data at time t, $X_{t-i}$ can comprise a lag value at time t−1, p can comprise an order of the AR portion of the ARMA model, $\varphi_i$ can comprise parameters of the AR portion of the ARMA model, and Et can comprise an error term (e.g., a while noise term).

In various embodiments, a MA portion of an ARMA model can be configured to predict a future value of a variable based on past error terms, otherwise known as error lags. A number of lags used to predict the future value can be referred to as an order of the MA model. For example, a tenth order MA portion of an ARMA model would use ten error lags to predict a future value. In many embodiments, a MA portion of an ARMA model can be represented by an equation comprising:

$$X_t = \mu + \sum_{i=1}^{q} \theta_i \varepsilon_{t-i} + \varepsilon_t$$

In these embodiments, $X_t$ can comprise a predicted value of sensor data at time t, μ can comprise a mean value of past sensor readings, $\varepsilon_{t-i}$ can comprise an error lag value at time t−1, q can comprise an order of the MA portion of the ARMA model, $\theta_i$ can comprise parameters of the MA portion of the ARMA model, and Et can comprise an error term (e.g., a while noise term).

In many embodiments, an AR portion of an ARMA model and a MA portion of an ARMA model can be combined to create an ARMA model. In these embodiments, an ARMA model can be represented by an equation comprising:

$$X_t = \mu + \sum\nolimits_{i=1}^{q} \theta_i \varepsilon_{t-i} + \varepsilon_t + \sum\nolimits_{i=1}^{p} \varphi_i X_{t-i} + \varepsilon_t.$$

Example 1

Figure 8:
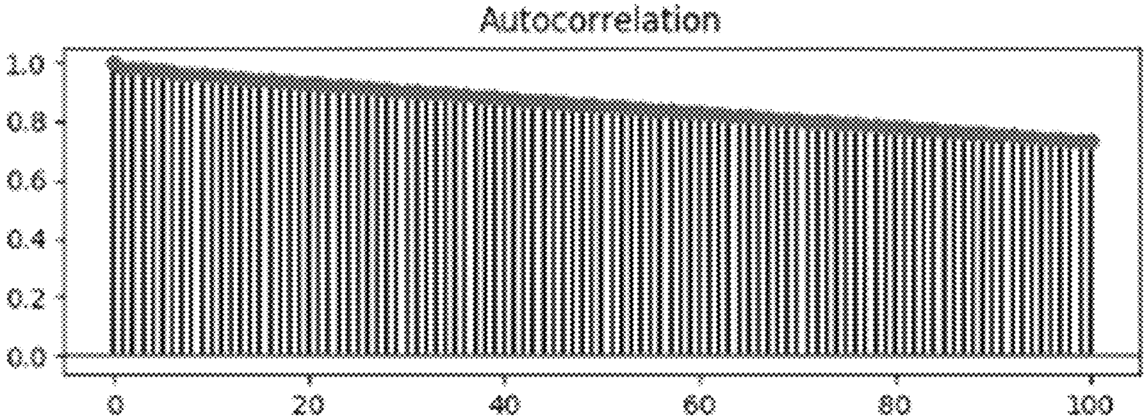
FIG. 8 is an autocorrelation graph for a predictive algorithm used in the method provided in FIGS. 2 and 7, according to certain embodiments.

Turning now to FIG. 8, an autocorrelation graph 800 of an example sensorized shipping container data set is shown. Generally speaking, an autocorrelation graph can be used to determine a randomness of a data set. Data sets with a high autocorrelation coefficient (displayed on the Y-axis) display a high correlation and therefore low randomness. As can be seen in the autocorrelation graph shown in FIG. 8, correlation of signals with different lengths of lags (displayed on the X-axis) decreases as the space between lags is increased. Therefore, using fresh and up-to date data in an ARMA model described herein can provide accurate predictions.

Example 2

Figure 9:
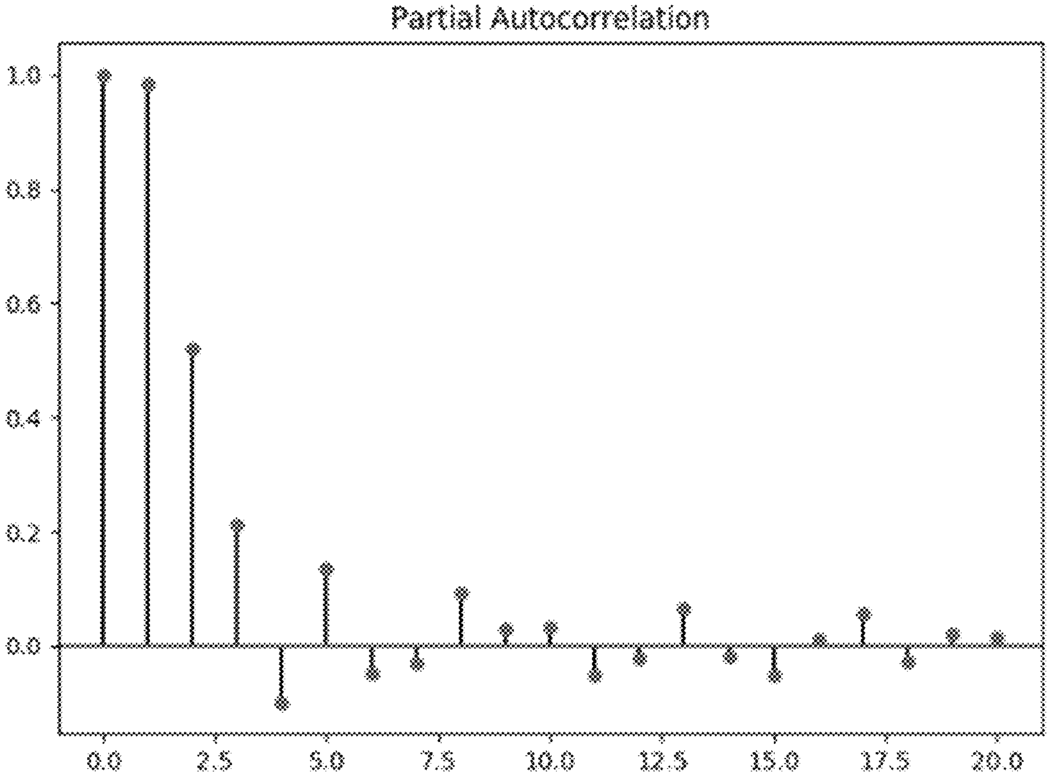
FIG. 9 is a partial autocorrelation graph for a predictive algorithm used in the method provided in FIGS. 2 and 7, according to certain embodiments.

Turning now to FIG. 9, a partial autocorrelation graph 900 of an example sensorized shipping container data set is shown. Generally speaking, a partial autocorrelation graph can be used to determine an order of an ARMA model. A number of lags (displayed on the X-axis) with a high partial autocorrelation coefficient (displayed on the Y-axis) show a high statistical significance and therefore create accurate predictions when implemented in an ARMA model. As can be seen in the partial autocorrelation graph shown in in FIG. 9, statistical significance becomes flat after 10 lags. Therefore, using a tenth order ARMA model (i.e., using 10 lags) can provide accurate predictions.

In many embodiments, a predictive algorithm can comprise an autoregressive integrated moving average model (ARIMA). Generally speaking, an ARIMA model can be used when a dataset has a nonstationary mean (e.g., a mean of past datapoints varies as a time series progresses). While an ARIMA model and an ARMA model are similar, one difference that can exist between the two models is that the ARIMA model contains an integrated portion. In some embodiments, an integrated portion of an ARIMA model can be created by transforming a time series so that a mean of the time series is approximately stationary. One way of transforming a mean of a time series is to subtract a lagged (e.g., previous) time point from a more recent time point. For example, a transformed sensor reading $z_t$ can be created by subtracting a previous reading at from a more recent reading $a_{t+1}$. In many embodiments, a number of subtractions used in to transform an ARIMA model can be referred to as an order of the model. For example, a second order model can be created by setting $w_t$ as a transformed time series equal to $Z_{t+1}-Z_t$. In various embodiments, an ARIMA model can be represented by an equation comprising:

$$z_t = \varphi_i z_{t-1} + \theta_i \varepsilon_{t-i} + \varepsilon_t$$

While the above referenced ARIMA model can be useful in a number of applications, in many embodiments it can be beneficial to use the ARIMA model to predict a future sensor reading instead of a difference between sensor readings. This can be referred to as recovering $X_t$. In an ARIMA model, a recovered $X_t$ can be represented by an equation comprising:

$$X_k = \sum_{i=1}^{k-l} z_{k-i} + a_l$$

In many embodiments, a predictive algorithm can comprise a neural network. Generally speaking, a neural network can be understood as a collection of connected nodes (sometimes referred to as artificial neurons or neurons), that loosely model cellular neurons in a biological brain. In some embodiments, much like a biological neuron/synapse system, nodes of a neural network can transmit signals to other nodes when they are activated. In these or other embodiments, nodes of a neural network can be activated when their activation function exceeds a predetermined threshold. For example, when an output of an activation function exceeds 0.75, a neuron can be activated and propagate its signal. A number of types of activation functions can be used in a neural network. For example, an activation function can comprise a linear function, a hyperbolic function, a sigmoid function, a piecewise function (e.g., a rectified linear unit), a tangential function, etc. In various embodiments, connections between nodes of a neural network can be weighted up or down. In this way, signals between nodes can be increased or decreased depending on the weights assigned to that connection. In various embodiments, weights for a neural network can be determined in a training process (e.g., as described in activity 703).

Nodes in a neural network can be organized in a number of ways. For example, a neural network can be organized as a feed forward neural network and/or a recurrent neural network. In various embodiments, all or a portion of different types of neural networks can be operated in series and/or in sequence. For example, a first portion of a neural network can comprise a set of recurrent nodes followed by a set of convolutional nodes.

Figure 10:
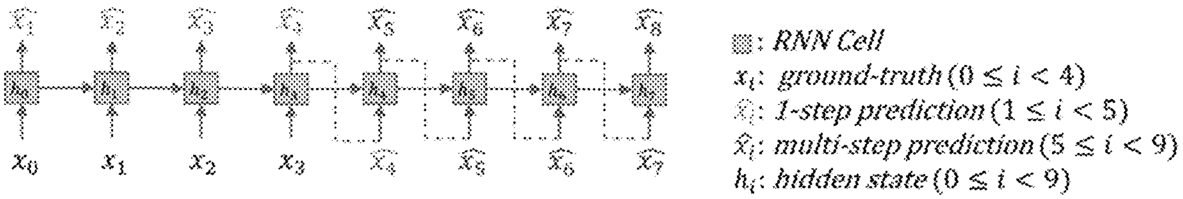
FIG. 10 is a diagram of a neural network used in the method provided in FIGS. 2 and 7, according to certain embodiments.

In many embodiments, a feed forward neural network (RNN) can comprise a set and/or sequence of nodes that do not form a cycle. In some embodiments, nodes in a feed forward neural network can only propagate their signal forward. For example, a single-layer perceptron network is a feed forward neural network. In some embodiments, a recurrent neural network can comprise a neural network where nodes create a cycle. For example, a long short-term memory (LSTM) is a recurrent neural network. Generally speaking, a LSTM network can be configured to process not only single data inputs (e.g., one type of sensor data), but also process series/sequences of data and multi-variate (e.g., multiple types of sensor data) data. Turning ahead in the drawings, FIG. 10 displays an exemplary recurrent neural network 1000 that can be used to predict and/or manage alarms for a sensorized shipping container. A number of different types of cells (or layers), inputs, outputs, and labels can be seen in neural network 1000, for example, ground truth inputs into the neural network. In many embodiments, a ground truth input can comprise an input into a neural network that is labeled as ground truth. Generally speaking, ground truth inputs can comprise sensor data gathered from a sensorized shipping container. Ground truth data can be differentiated from predicted data (e.g., 1-step predictions and/or multi-step predictions) in that ground truth data can be derived (sometimes directly) from real world measurements. Predicted data, on the other hand, can be generated by the neural network or some other predictive algorithm. For example, predicted output $\widehat{x_1}$ is generated by an RNN node containing hidden state ho using at least ground truth input $x_0$. In various embodiments, a hidden state (also known as a hidden layer) can comprise a node in a neural network that is between an input layer and an output layer. In some embodiments, a hidden state can vary depending on a function of a neural network. Further, hidden states may vary amongst each other depending on their associated weights. Generally speaking, a hidden state can comprise a mathematical function (e.g., an activation function) that is nonlinear.

In many embodiments, a predictive algorithm can comprise a decision tree algorithm. Generally speaking, a decision tree can comprise one or more nodes connected by one or more branches. A number of different types of nodes can be present in a decision tree. For example, a node can be a decision node or a leaf node. In some embodiments, a decision node in a decision tree algorithm can classify data points into two or more classifications. For example, a decision node can classify a datapoint as indicating that a shipping container needs repair or as indicating that a shipping container does not need repair. In these or other embodiments, a leaf node can comprise a node where data points are of the same or similar classification. In this way, data points can be classified by being fed into a first decision node of a decision tree (known as a root node) and then passed through the branches to other decision nodes and leaf nodes. In various embodiments, classification of a datapoint can end when it reaches a leaf node. In some embodiments, a decision tree model can comprise a random forest model. Generally speaking, a random forest model can comprise and algorithm in which multiple decision trees are used in parallel to classify a data point. In various embodiments, a decision tree algorithm can comprise a gradient boost algorithm. Generally speaking, boosting is an ensemble learning method that builds consecutive small trees (some as small as one node), where each consecutive tree is focused on correcting an error from a previous tree. In some embodiments, an optimization algorithm can be used in combination with a boosted decision tree, thereby creating a gradient boosted algorithm. In various embodiments, an optimization algorithm can be configured to minimize a cost function (e.g., an error or a loss). In this way, a decision tree algorithm can be made more accurate than other predictive algorithms.

In many embodiments, method 700 can comprise an activity 704 of analyzing sensor data using a predictive algorithm. In various embodiments, sensor data can be concatenated into a series or sequence before being analyzed by a predictive algorithm. In some embodiments, sensor data can be converted into a vector before being analyzed by a predictive algorithm. In various embodiments, sensor data can be fed into a predictive algorithm to be analyzed. For example, a vector created using sensor data can be inputted into a first node of a neural network or a first node of a tree based algorithm. In some embodiments, sensor data can be streamed from a sensorized shipping container to a web server or computer hosting a predictive algorithm. In these or other embodiments, a predictive algorithm can be stored in a storage module of a sensorized shipping container, and the analysis can occur on the sensorized shipping container itself. In some embodiments, activity 704 can be performed in real time and/or periodically. As defined herein, "real-time" can, in some embodiments, be defined with respect to operations carried out as soon as practically possible upon occurrence of a triggering event. A triggering event can include receipt of data necessary to execute a task or to otherwise process information (e.g., receiving sensor data). Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

In many embodiments, method 700 can comprise an activity 705 of initiating one or more alarms based on analysis of sensor data. In various embodiments, an alarm can be initiated in response to an output of a predictive algorithm. Some predictive algorithms output a number in a range of numbers that correlate with a state of a sensorized shipping container. For example, a predictive algorithm can output a number between zero and one. In some embodiments, when an output of an algorithm is above a predetermined threshold, an alarm can be triggered. A number of different types of alarms can be triggered in activity 705. For example, alarms described in FIGS. 1-6 can be triggered.

While the detailed discussion of the system, method, and apparatus is concluded, it is also helpful to provide a brief summary in the following concluding paragraphs. For instance, in various embodiments, a method is provided. The method may be for electronically monitoring temperature-sensitive material inside a shipping container during shipment. The method may include a variety of steps provided below. For example, the method may include monitoring a tilt of the shipping container and a temperature inside the shipping container over a first duration of time. The method may also include sampling various data. For instance, the method may include sampling values of the monitored tilt of the shipping container over the first duration of time and storing a maximum tilt value over the first duration of time corresponding to the largest sample and a minimum tilt value over the first duration of time corresponding to the smallest sample. In various instances, further sampling aspects are contemplated. For instance, the method may include sampling values of the monitored temperature inside the shipping container over the first duration of time and storing a temperature sample array.

In addition to the sampling aspects, the method may include sub-dividing the temperature sample array into sub-arrays associated with corresponding sub-durations of time of the first duration of time and calculating a rate of change of temperature for each sub-array associated with each corresponding sub-duration. Other calculating aspects may be included. The method may include calculating a rate of change of temperature for the temperature sample array over the first duration of time, calculating an amount of change of temperature for each sub-array associated with each corresponding sub-duration, and calculating an amount of change of temperature for the temperature sample array over the first duration of time.

Furthermore, the method may include applying a variety of filters. For instance, the method may include applying a plurality of filters to certain variables. These variables include (i) the maximum tilt value, (ii) the minimum tilt value, (iii) a present temperature value, (iv) the amount of change of temperature for at least one sub-array associated with the corresponding sub-duration, (v) the amount of change of temperature for the temperature sample array over the first duration of time, (vi) the rate of change of temperature for at least one sub-array associated with the corresponding sub-duration, and (vii) the rate of change of temperature for the temperature sample array over the first duration of time.

Finally, the method may include setting a state of a failure status flag in response to the filtering. The state may be one of the following states. For instance, the state may be one of: (i) not set, (ii) alarm, (iii) no alarm, (iv) warm, and (v) false alarm.

The method may include other features, which may be exhibited in various optional and non-limiting embodiments. In one non-limiting embodiment, the method includes that the state of the failure status flag is set to false alarm in response to each condition of a first filter having a first set of conditions being true and the state of the failure status flag is set to not set in response to at least one of the first set of conditions being false. In such a scenario, the first set of conditions may include the following aspects. First, the amount of change of temperature for the temperature sample array over the first duration of time is greater than a first temperature rate threshold. Second, a maximum tilt value during the first duration of time is greater than or equal to a maximum tilt limit. Third, a minimum tilt value during the first duration of time is less than or equal to a minimum tilt limit. Finally, a present temperature value is less than a first upper temperature threshold.

In various embodiments, the first temperature rate threshold is four degrees, the first duration of time is five hours, the maximum tilt limit is 20 degrees, and the minimum tilt limit is 20 degrees. Moreover, the first upper temperature threshold may be −150 degrees Celsius.

In response to the at least one condition of the first set of conditions being false, a second filter may be applied. The second filter may include a second set of conditions. Also, the state of the failure status flag may be set to alarm in response to the second set of conditions being all true. The state of the failure status flag may be set to not set in response to at least one condition of the second set of conditions being false. In such an instance, the second set of conditions may include the following. First, the amount of change of temperature for each sub-array may be each greater than or equal to a minimum temperature increase threshold. Second, a present temperature value may be between a first upper temperature threshold and a first lower temperature threshold.

In various associated instances, the minimum temperature increase threshold is 0.8 degrees Celsius. Additionally, each sub-array is associated with a sub-duration of time equal to one hour. Furthermore, the first duration of time equals five hours, the first upper temperature threshold is −150 degrees Celsius, and the first lower temperature threshold is −190 degrees Celsius.

Still further, in some embodiments, and in response to the at least one condition of the second set of conditions being false, a third filter may be applied. The third filter may include a further set of conditions. For instance, the third filter may include a third set of conditions in which the state of the failure status flag is set to alarm in response to the third set of conditions being all true and set to not set in response to at least one condition of the third set of conditions being false. This third set of conditions may include the following. First, that the present temperature value is greater than a first upper temperature threshold. Second, that the temperature sample array contains temperatures that are each above the first upper temperature threshold for a number of samples corresponding to less than a second duration of time.

For such instances, in various embodiments, the second duration of time is four hours. Similarly, the first duration of time is five hours, and the first upper temperature threshold is −150 degrees Celsius.

In various instances, and further in response to the at least one condition of the third set of conditions being false, a fourth filter is applied. For example, the fourth filter may include a fourth set of conditions. The state of the failure status flag may be set to warm in response to the fourth set of conditions being all true. The state of the failure status flag may be set to not set in response to at least one condition of the fourth set of conditions being false.

The fourth set of conditions may comprise when the temperature sample array contains temperatures that are each above the first upper temperature threshold for a number of samples corresponding to greater than or equal to a second duration of time. In various embodiments, the second duration of time is four hours, the first duration of time is five hours, and the first upper temperature threshold is −150 degrees Celsius.

In some embodiments, in response to the at least one condition of the fourth set of conditions being false, a fifth filter is applied. The fifth filter may comprise additional conditions. For instance, the fifth filter may include a fifth set of conditions and the state of the failure status flag may be set to false alarm in response to the fifth set of conditions being all true and set to no alarm in response to at least one condition of the fifth set of conditions being false.

The fifth set of conditions may include the following conditions. First, that the amount of change of temperature for at least one of the sub-arrays exceeds or equals a sub-array amount limit. Second, that the present temperature value is less than or equal to a sampled value of the monitored temperature inside the shipping container collected the first duration of time in the past. In such instances, each sub-duration of time may be one hour. The first duration of time may be five hours. The sub-array amount limit may be 20 degrees Celsius. Moreover, a remote monitoring controller may read the state of the failure status flag and may display a human-readable alarm corresponding to the state of the failure status flag.

In addition to the aspects presented above, the disclosure herein may include a further method. For instance, a method of electronically monitoring temperature-sensitive material inside a shipping container during shipping. The method may include various aspects. For example, the method may include receiving electronic data corresponding to a plurality of environmental variables collected by sensors attached to the shipping container. The method may include storing electronic values of the plurality of environmental variables over a first duration of time. In addition, the method may include calculating a rate of change of the electronic values of at least one of the environmental variables over the first duration of time, calculating a magnitude of change of the electronic values of at least one of the environmental variables over the first duration of time, and setting a state of failure status flag in response to at least one of the rate of change over the first duration of time of at least one of the environmental variables and the magnitude of change over the first duration of time of the at least one of the environmental variables satisfying one or more filter.

A computer-readable storage medium is also disclosed. The computer-readable storage medium may be for storing instructions that when executed by a computer cause the computer to perform a method for using a computer system to electronically monitor temperature-sensitive material inside a shipping container during shipment. The method may include various of the following aspects. For instance, the method may include monitoring a tilt of the shipping container and a temperature inside the shipping container over a first duration of time. The method may include sampling values of the monitored tilt of the shipping container over the first duration of time and storing a maximum tilt value over the first duration of time corresponding to the largest sample and a minimum tilt value over the first duration of time corresponding to the smallest sample. The method may also include sampling values of the monitored temperature inside the shipping container over the first duration of time and storing a temperature sample array. In addition, the method may include sub-dividing the temperature sample array into sub-arrays associated with corresponding sub-durations of time of the first duration of time.

Various calculating steps may be contemplated. For instance, the method may include calculating a rate of change of temperature for each sub-array associated with each corresponding sub-duration. The method may include calculating a rate of change of temperature for the temperature sample array over the first duration of time. The method may include calculating an amount of change of temperature for each sub-array associated with each corresponding sub-duration and calculating an amount of change of temperature for the temperature sample array over the first duration of time. Moreover, the method may include applying a plurality of filters. For instance, the method may include applying a plurality of filters to certain variables. These variables include (i) the maximum tilt value, (ii) the minimum tilt value, (iii) a present temperature value, (iv) the amount of change of temperature for at least one sub-array associated with the corresponding sub-duration, (v) the amount of change of temperature for the temperature sample array over the first duration of time, (vi) the rate of change of temperature for at least one sub-array associated with the corresponding sub-duration, and (vii) the rate of change of temperature for the temperature sample array over the first duration of time.

Finally, the method may include setting a state of a failure status flag in response to the filtering. The state may be one of the following states. For instance, the state may be one of: (i) not set, (ii) alarm, (iii) no alarm, (iv) warm, and (v) false alarm.

The state of the failure status flag may be set to false alarm in response to each condition of a first filter having a first set of conditions being true. The state of the failure status flag may be set to not set in response to at least one of the first set of conditions being false. The first set of conditions may include the following aspects. For instance, the first set of conditions may include (i) the amount of change of temperature for the temperature sample array over the first duration of time is greater than a first temperature rate threshold, (ii) a maximum tilt value during the first duration of time is greater than or equal to a maximum tilt limit, (iii) a minimum tilt value during the first duration of time is less than or equal to a minimum tilt limit, (iv) and a present temperature value is less than a first upper temperature threshold.

In various embodiments, and further in response to the at least one condition of the first set of conditions being false, a second filter may be applied. The second filter may include a second set of conditions. The state of the failure status flag may be set to alarm in response to the second set of conditions being all true and set to not set in response to at least one condition of the second set of conditions being false.

The second set of conditions may include the following conditions. First, the amount of change of temperature for each sub-array may be each greater than or equal to a minimum temperature increase threshold. Second, a present temperature value may be between a first upper temperature threshold and a first lower temperature threshold.

In various embodiments, the minimum temperature increase threshold is 0.8 degrees Celsius. Each sub-array may be associated with a sub-duration of time equal to one hour and the first duration of time may equal five hours. Moreover, the first upper temperature threshold may be −150 degrees Celsius, and the first lower temperature threshold may be −190 degrees Celsius.

Moreover, and further in response to the at least one condition of the second set of conditions being false, a third filter may be applied. The third filter may include a third set of conditions. Also, the state of the failure status flag may be set to alarm in response to the third set of conditions being all true and may be set to not set in response to at least one condition of the third set of conditions being false.

In various embodiments, the third set of conditions comprise two conditions. First, the present temperature value is greater than a first upper temperature threshold. Second, the temperature sample array contains temperatures that are each above the first upper temperature threshold for a number of samples corresponding to less than a second duration of time.

In yet further embodiments and in response to the at least one condition of the third set of conditions being false, a fourth filter may be applied. In various instances, the fourth filter includes a fourth set of conditions. In various instances, the state of the failure status flag is set to warm in response to the fourth set of conditions being all true and set to not set in response to at least one condition of the fourth set of conditions being false.

The fourth set of conditions may include that the temperature sample array contains temperatures that are each above the first upper temperature threshold for a number of samples corresponding to greater than or equal to a second duration of time.

Finally, further in response to the at least one condition of the fourth set of conditions being false, a fifth filter may be applied. The fifth filter may include a fifth set of conditions. Also, the state of the failure status flag may be set to false alarm in response to the fifth set of conditions being all true and set to no alarm in response to at least one condition of the fifth set of conditions being false. The fifth set of conditions may include that the amount of change of temperature for at least one of the sub-arrays exceeds or equals a sub-array amount limit. The fifth set of conditions may also include that the present temperature value is less than or equal to a sampled value of the monitored temperature inside the shipping container collected the first duration of time in the past.

The detailed description of exemplary embodiments herein refers to the accompanying drawings and pictures, which show various embodiments by way of illustration. While these various embodiments are described in sufficient detail to enable those skilled in the art to practice the disclosure, it should be understood that other embodiments may be realized, and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a range of "less than 10" includes any and all subranges between (and including) the minimum value of zero and the maximum value of 10, that is, any and all subranges having a minimum value of equal to or greater than zero and a maximum value of equal to or less than 10, e.g., 1 to 5.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. Reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each, and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method of electronically monitoring temperature-sensitive material inside a shipping container during shipment, the method comprising:

monitoring a tilt of the shipping container and a temperature inside the shipping container over a first duration of time;

sampling values of the monitored tilt of the shipping container over the first duration of time and storing a maximum tilt value over the first duration of time corresponding to a largest sample and a minimum tilt value over the first duration of time corresponding to a smallest sample;

sampling values of the monitored temperature inside the shipping container over the first duration of time and storing a temperature sample array;

sub-dividing the temperature sample array into sub-arrays associated with corresponding sub-durations of time of the first duration of time;

calculating a rate of change of temperature for each sub-array associated with each corresponding sub-duration;

calculating a rate of change of temperature for the temperature sample array over the first duration of time;

calculating an amount of change of temperature for each sub-array associated with each corresponding sub-duration;

calculating an amount of change of temperature for the temperature sample array over the first duration of time;

applying a plurality of filters to the maximum tilt value, the minimum tilt value, a present temperature value, the amount of change of temperature for at least one sub-array associated with the corresponding sub-duration, the amount of change of temperature for the temperature sample array over the first duration of time, the rate of change of temperature for at least one sub-array associated with the corresponding sub-duration, and the rate of change of temperature for the temperature sample array over the first duration of time; and setting a state of a failure status flag in response to the filtering, wherein the state comprises one of: not set, alarm, no alarm, warm, and false alarm.

2. The method according to claim 1, wherein the state of the failure status flag is set to false alarm in response to each condition of a first filter having a first set of conditions being true and wherein the state of the failure status flag is set to not set in response to at least one of the first set of conditions being false, the first set of conditions comprising:

the amount of change of temperature for the temperature sample array over the first duration of time is greater than a first temperature rate threshold;

a maximum tilt value during the first duration of time is greater than or equal to a maximum tilt limit;

a minimum tilt value during the first duration of time is less than or equal to a minimum tilt limit; and a present temperature value is less than a first upper temperature threshold.

3. The method according to claim 2, wherein the first temperature rate threshold is four degrees;

the first duration of time is five hours, the maximum tilt limit is 20 degrees, and the minimum tilt limit is 20 degrees.

4. The method according to claim 3, wherein the first upper temperature threshold is-150 degrees Celsius.

5. The method of claim 2, wherein, further in response to the at least one condition of the first set of conditions being false, a second filter is applied, wherein the second filter comprises a second set of conditions and wherein the state of the failure status flag is set to alarm in response to the second set of conditions being all true and set to not set in response to at least one condition of the second set of conditions being false, the second set of conditions comprising:

the amount of change of temperature for each sub-array is each greater than or equal to a minimum temperature increase threshold; and a present temperature value is between a first upper temperature threshold and a first lower temperature threshold.

6. The method of claim 5, wherein the minimum temperature increase threshold is 0.8 degrees Celsius, wherein each sub-array is associated with a sub-duration of time equal to one hour and wherein the first duration of time equals five hours, and wherein the first upper temperature threshold is-150 degrees Celsius, and the first lower temperature threshold is-190 degrees Celsius.

7. The method of claim 5, wherein, further in response to the at least one condition of the second set of conditions being false, a third filter is applied, wherein the third filter comprises a third set of conditions and wherein the state of the failure status flag is set to alarm in response to the third set of conditions being all true and set to not set in response to at least one condition of the third set of conditions being false, the third set of conditions comprising:

the present temperature value is greater than a first upper temperature threshold; and the temperature sample array contains temperatures that are each above the first upper temperature threshold for a number of samples corresponding to less than a second duration of time.

8. The method of claim 7, wherein the second duration of time is four hours, the first duration of time is five hours, and the first upper temperature threshold is-150 degrees Celsius.

9. The method of claim 7, wherein, further in response to the at least one condition of the third set of conditions being false, a fourth filter is applied, wherein the fourth filter comprises a fourth set of conditions and wherein the state of the failure status flag is set to warm in response to the fourth set of conditions being all true and set to not set in response to at least one condition of the fourth set of conditions being false, the fourth set of conditions comprising:

the temperature sample array contains temperatures that are each above the first upper temperature threshold for a number of samples corresponding to greater than or equal to a second duration of time.

10. The method of claim 9, wherein the second duration of time is four hours, the first duration of time is five hours, and the first upper temperature threshold is-150 degrees Celsius.

11. The method of claim 9, wherein, further in response to the at least one condition of the fourth set of conditions being false, a fifth filter is applied, wherein the fifth filter comprises a fifth set of conditions and wherein the state of the failure status flag is set to false alarm in response to the fifth set of conditions being all true and set to no alarm in response to at least one condition of the fifth set of conditions being false, the fifth set of conditions comprising:

the amount of change of temperature for at least one of the sub-arrays exceeding or equaling a sub-array amount limit; and the present temperature value being less than or equal to a sampled value of the monitored temperature inside the shipping container collected the first duration of time in the past.

12. The method of claim 11, wherein each sub-duration of time is one hour, the first duration of time is five hours, and the sub-array amount limit is 20 degrees Celsius, and wherein a remote monitoring controller reads the state of the failure status flag and displays a human-readable alarm corresponding to the state of the failure status flag.

13. A computer-readable storage medium storing instructions that when executed by a computer cause the computer to perform a method for using a computer system to electronically monitor temperature-sensitive material inside a shipping container during shipment, the method comprising:

monitoring a tilt of the shipping container and a temperature inside the shipping container over a first duration of time;

sampling values of the monitored tilt of the shipping container over the first duration of time and storing a maximum tilt value over the first duration of time corresponding to a largest sample and a minimum tilt value over the first duration of time corresponding to a smallest sample;

sampling values of the monitored temperature inside the shipping container over the first duration of time and storing a temperature sample array;

sub-dividing the temperature sample array into sub-arrays associated with corresponding sub-durations of time of the first duration of time;

calculating a rate of change of temperature for each sub-array associated with each corresponding sub-duration;

calculating a rate of change of temperature for the temperature sample array over the first duration of time;

calculating an amount of change of temperature for each sub-array associated with each corresponding sub-duration;

calculating an amount of change of temperature for the temperature sample array over the first duration of time;

applying a plurality of filters to the maximum tilt value, the minimum tilt value, a present temperature value, the amount of change of temperature for at least one sub-array associated with the corresponding sub-duration, the amount of change of temperature for the temperature sample array over the first duration of time, the rate of change of temperature for at least one sub-array associated with the corresponding sub-duration, and the rate of change of temperature for the temperature sample array over the first duration of time; and setting a state of a failure status flag in response to the filtering, wherein the state comprises one of: not set, alarm, no alarm, warm, and false alarm.

14. The computer-readable storage medium according to claim 13, wherein the state of the failure status flag is set to false alarm in response to each condition of a first filter having a first set of conditions being true and wherein the state of the failure status flag is set to not set in response to at least one of the first set of conditions being false, the first set of conditions comprising:

the amount of change of temperature for the temperature sample array over the first duration of time is greater than a first temperature rate threshold;

a maximum tilt value during the first duration of time is greater than or equal to a maximum tilt limit;

a minimum tilt value during the first duration of time is less than or equal to a minimum tilt limit; and a present temperature value is less than a first upper temperature threshold.

15. The computer-readable storage medium according to claim 14, wherein, further in response to the at least one condition of the first set of conditions being false, a second filter is applied, wherein the second filter comprises a second set of conditions and wherein the state of the failure status flag is set to alarm in response to the second set of conditions being all true and set to not set in response to at least one condition of the second set of conditions being false, the second set of conditions comprising:

the amount of change of temperature for each sub-array is each greater than or equal to a minimum temperature increase threshold; and a present temperature value is between a first upper temperature threshold and a first lower temperature threshold.

16. The computer-readable storage medium according to claim 15, wherein the minimum temperature increase threshold is 0.8 degrees Celsius, wherein each sub-array is associated with a sub-duration of time equal to one hour and wherein the first duration of time equals five hours, and wherein the first upper temperature threshold is −150 degrees Celsius, and the first lower temperature threshold is −190 degrees Celsius.

17. The computer-readable storage medium according to claim 15, wherein, further in response to the at least one condition of the second set of conditions being false, a third filter is applied, wherein the third filter comprises a third set of conditions and wherein the state of the failure status flag is set to alarm in response to the third set of conditions being all true and set to not set in response to at least one condition of the third set of conditions being false, the third set of conditions comprising:

the present temperature value is greater than a first upper temperature threshold; and the temperature sample array contains temperatures that are each above the first upper temperature threshold for a number of samples corresponding to less than a second duration of time.

18. The computer-readable storage medium according to claim 17, wherein, further in response to the at least one condition of the third set of conditions being false, a fourth filter is applied, wherein the fourth filter comprises a fourth set of conditions and wherein the state of the failure status flag is set to warm in response to the fourth set of conditions being all true and set to not set in response to at least one condition of the fourth set of conditions being false, the fourth set of conditions comprising:

the temperature sample array contains temperatures that are each above the first upper temperature threshold for a number of samples corresponding to greater than or equal to a second duration of time.

19. The computer-readable storage medium according to claim 17, wherein, further in response to the at least one condition of the fourth set of conditions being false, a fifth filter is applied, wherein the fifth filter comprises a fifth set of conditions and wherein the state of the failure status flag is set to false alarm in response to the fifth set of conditions being all true and set to no alarm in response to at least one condition of the fifth set of conditions being false, the fifth set of conditions comprising:

the amount of change of temperature for at least one of the sub-arrays exceeding or equaling a sub-array amount limit; and the present temperature value being less than or equal to a sampled value of the monitored temperature inside the shipping container collected the first duration of time in the past.

* * * * *